(12) United States Patent
Araki et al.

(10) Patent No.: US 6,452,545 B2
(45) Date of Patent: Sep. 17, 2002

(54) GPS RECEIVER, POSITION-DETECTING SYSTEM AND POSITIONING METHOD

(75) Inventors: Mikio Araki; Hiroshi Sato, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/768,510

(22) Filed: Jan. 25, 2001

Related U.S. Application Data

(63) Continuation of application No. PCT/JP99/03219, filed on Jun. 16, 1999.

(51) Int. Cl.[7] .............................. G01S 5/02; H04B 7/185

(52) U.S. Cl. .................................. 342/357.15; 701/213

(58) Field of Search ..................... 342/357.15; 701/213

(56) References Cited

U.S. PATENT DOCUMENTS

| | | | | |
|---|---|---|---|---|
| 5,373,531 A | * | 12/1994 | Kawasaki | ................. 375/1 |
| 5,402,347 A | * | 3/1995 | McBurney et al. | |
| 5,594,453 A | * | 1/1997 | Rodal et al. | ............. 342/352 |
| 6,282,495 B1 | * | 8/2001 | Kirkhart et al. | ........... 701/213 |

FOREIGN PATENT DOCUMENTS

| | | |
|---|---|---|
| JP | A3162619 | 7/1991 |
| JP | A31181875 | 8/1991 |
| JP | A3235079 | 10/1991 |
| JP | A3295483 | 12/1991 |
| JP | A4326078 | 11/1992 |
| JP | A10282205 | 10/1998 |

* cited by examiner

Primary Examiner—Theodore M. Blum

(57) ABSTRACT

When a 2-dimensional positioning or 3-dimensional positioning cannot be completed within a predetermined period of time, all currently seized satellites are cancelled and a stored almanac is referred to in order to resume attempts to seize satellites.

8 Claims, 5 Drawing Sheets

GPS RECEIVER, POSITION-DETECTING SYSTEM AND POSITIONING METHOD

CROSS-REFERENCE TO THE RELATED APPLICATION

This Application is a continuation of International Application No. PCT/JP99/03219, whose International filing date is Jun. 16, 1999, the disclosures of which Application are incorporated by reference-herein.

BACKGROUND OF THE INVENTION

1. Field of the Invention

The present-invention relates to a GPS receiver, a position-detecting system and a positioning method, which are used for determining a current position from received GPS data.

2. Description of the Related Art

When in a power-on state, a conventional GPS receiver carries out processing to pick up a signal from or seizes one of a plurality of GPS satellites revolving around the earth when there is neither valid almanac nor ephemeris data. The total number of fully operating GPS satellites is 24. For example, the GPS receiver seizes a first GPS satellite.

If the GPS receiver successfully seizes the first GPS satellite, the receiver receives GPS data from the satellite and stores an almanac included in the data.

The almanac comprises information schematically showing the loci of all the GPS satellites. By referring to the almanac, it is possible to determine the orientation of each of the GPS satellites in each time zone. The almanac data is transmitted in 1/25 units at intervals of 30 seconds. Thus, the transmission of all the almanac data is completed in 12.5 minutes.

If the GPS receiver fails to seize the first GPS satellite, the GPS receiver proceed, for example, to seize the second GPS satellite.

If the GPS receiver successfully seizes the second GPS satellite, the receiver receives GPS data from the satellite and stores an almanac included in the GPS data.

If the GPS receiver fails to seize the second GPS satellite, the GPS receiver proceed, for example, to seize the third GPS satellite. The GPS receiver repeats the process of seizure until it successfully seizes the GPS satellite so as to acquire the almanac.

The GPS receiver stores the almanac thus acquired. It is assumed herein that the GPS receiver seizes the first GPS satellite successfully. The GPS receiver refers to the almanac included in the GPS data received from the first GPS satellite to learn the positions of the GPS satellites at the present point of time, that is, the positions of the GPS satellites recorded in the acquired almanac at the present point of time, in order to search the almanac for GPS satellites that are seizable (GPS satellites other than the first GPS satellite). For example, the seizable GPS satellite may be a satellite visible to the GPS receiver. It should be noted that, since a position or an altitude cannot be determined from the GPS data received from only one satellite, the GPS receiver seizes a plurality of GPS satellites.

When a seizable GPS satellite is identified from the search, the GPS receiver proceed to seize the identified GPS satellite by using a spread code corresponding to the satellite.

When the GPS receiver successfully seizes the GPS satellites, the receiver receives the GPS data from the satellites to find a difference between a time according to each satellite and a time according to the receiver. The time according to a GPS satellite is included in GPS data of the satellite. The GPS receiver then computes a distance from the receiver to each GPS satellite from the difference in time between the receiver and the satellite.

Then, the GPS receiver calculates the current position thereof from the differences in time between the receiver and the GPS satellites.

It should be noted that, if the precision of the computed current position is equal to or smaller than a first threshold value, a 2-dimensional positioning with respect to a latitude and a longitude is assumed to have been completed whereas, if the precision of the computed present position is equal to or smaller than a second threshold value, a 3-dimensional positioning with respect to a latitude, a longitude and an altitude is assumed to have been completed. The precision of the current position can be found geometrically from the layout of the GPS satellites. The first threshold value is greater than the second threshold value and, the smaller the threshold values, the higher the positional precision.

It should be noted that, if valid almanac data is found at a power-on time, the data is searched for seizable GPS satellites by using the time as a basis.

According to the construction of the conventional GPS receiver as described above, an almanac is searched for seizable GPS satellites so that the GPS satellites identified as a result of the search are seized. The current position is determined from the GPS data of the seized GPS satellites. The positioning operation is continued until the 2-dimensional positioning or the 3-dimensional positioning is completed even if a predetermined period of time has lapsed. However, there is a problem with respect to the length of time taken to finish the 2-dimensional positioning or the 3-dimensional positioning.

SUMMARY OF THE INVENTION

Accordingly, an object of the present invention is to provide a GPS receiver, a position-detecting system and a positioning method, which are capable of determining a current position in a short period of time by completing seizure of the GPS satellites required for the determination of the current position in a short period of time.

The GPS receiver according to the invention, causes a seizing means to cancel all currently seized satellites and to resume attempts to seize satellites by referring to an almanac stored in a storage means when the positioning means fails to complete a process of determining a current position within a predetermined period of time.

According to this aspect, it is possible to determine the current position efficiently.

The GPS receiver according to the invention may search for seizable satellites by referring to the almanac to identify current positions of the satellites.

According to this aspect, it is possible to seize the satellites within a short period of time.

The position-detecting system according to the invention is provided with a GPS receiver causes a seizing means to cancel all currently seized satellites and to resume attempts to seize satellites by referring to an almanac stored in a storage means when the positioning means fails to complete a process of determining a current position within a predetermined period of time.

According to this aspect, it is possible to seize a satellites necessary for positioning within a short period of time so that the current position is efficiently determined and presented.

The position-detecting system according to the invention may be provided with a power supply closing means for turning on a power supply of the GPS receiver when a predetermined operation is carried out before a power supply of the presenting means is turned on.

According to this aspect, the current position is immediately presented to a user as the user gets on a vehicle and turns on a power of the presenting means by turning on a switch for activating accessories to the vehicle.

The position-detecting system according to the invention may be constructed such that the power supply of the GPS receiver is turned on when a door-lock state of vehicle is released.

According to this aspect, the current position is immediately presented to a user as the user gets on a vehicle and turns on a power of the presenting means by turning on a switch for activating accessories to the vehicle.

The position-detecting system according to the invention may be constructed such that the power supply of the GPS receiver is turned on when a door of the vehicle is opened.

According to this aspect, the current position is immediately presented to a user as the user gets on a vehicle and turns on a power of the presenting means by turning on a switch for activating accessories to the vehicle.

The positioning method according to the invention cancels all currently seized satellites and resumes attempts to seize satellites by referring to a stored almanac when a process of determining a current position is not completed within a predetermined period of time.

According to this aspect, it is possible to determine the current position efficiently.

The positioning method according to the invention may search for seizable satellites by referring to the almanac to identify current positions of the satellites.

According to this aspect, it is possible to seize the satellites within a short period of time.

BRIEF DESCRIPTION OF DRAWINGS

Other objects and further features of the present invention will be apparent from the following detailed description when read in conjunction with the accompanying drawings, in which.

DETAILED DESCRIPTION OF THE PREFERRED EMBODIMENTS

In order to explain details of the present invention, preferred embodiments of the present invention are described by referring to the diagrams briefly described above.

First Embodiment

Figure 1:
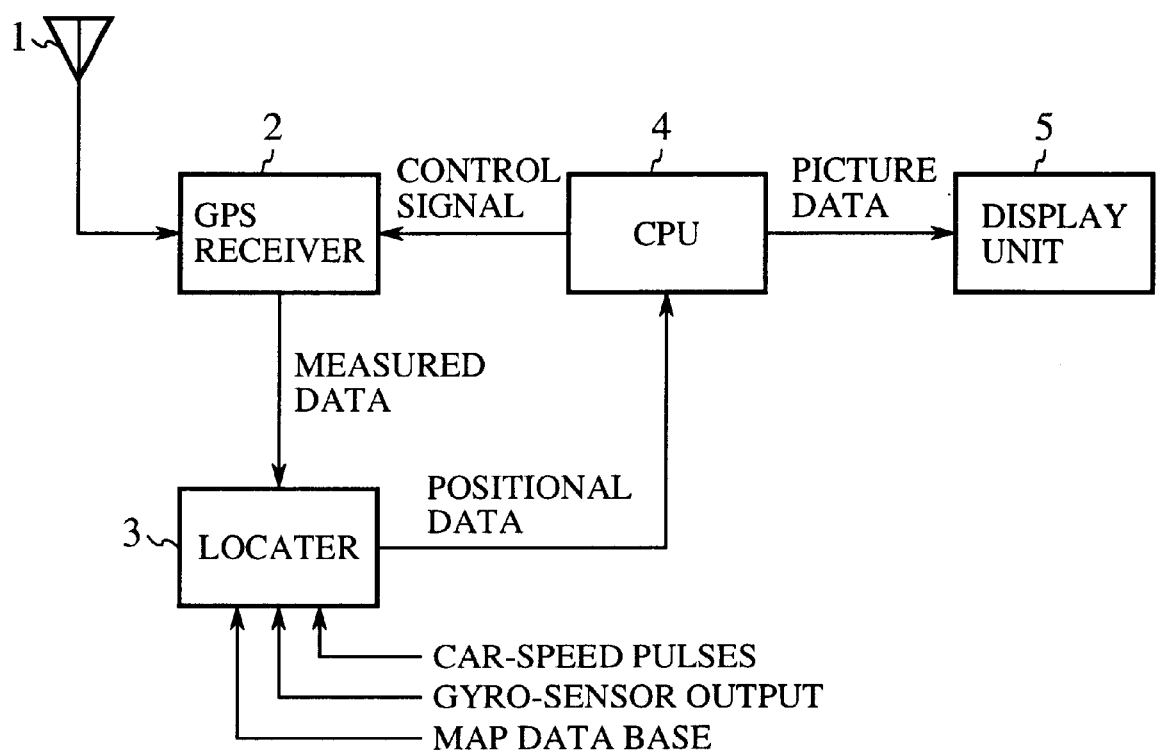
FIG. 1 is a diagram showing the configuration of a position-detecting system implemented by a first embodiment of the present invention.

FIG. 1 is a diagram showing the configuration of a position-detecting system implemented by a first embodiment of the present invention. In the figure, reference numeral 1 denotes a GPS antenna and reference numeral 2 denotes a GPS receiver for identifying a current position by receiving GPS data from a plurality of GPS satellites and for outputting positioning data representing the current position. Reference numeral 3 denotes a locator for estimating a current position from the positioning data received from the GPS receiver 2, from a pulse signal (car speed pulse) received for each travel by a vehicle carrying the receiver over a predetermined distance and from a map database for storing information on roads and intersections. Reference numeral 4 denotes a CPU (presenting means) for generating picture data related to the current position from positional data produced by estimation by the locator 3, and for controlling the GPS receiver 2. Reference numeral 5 denotes a display unit (presenting means) for displaying the current position of the vehicle-according to the picture data generated by the CPU 4.

Figure 2:
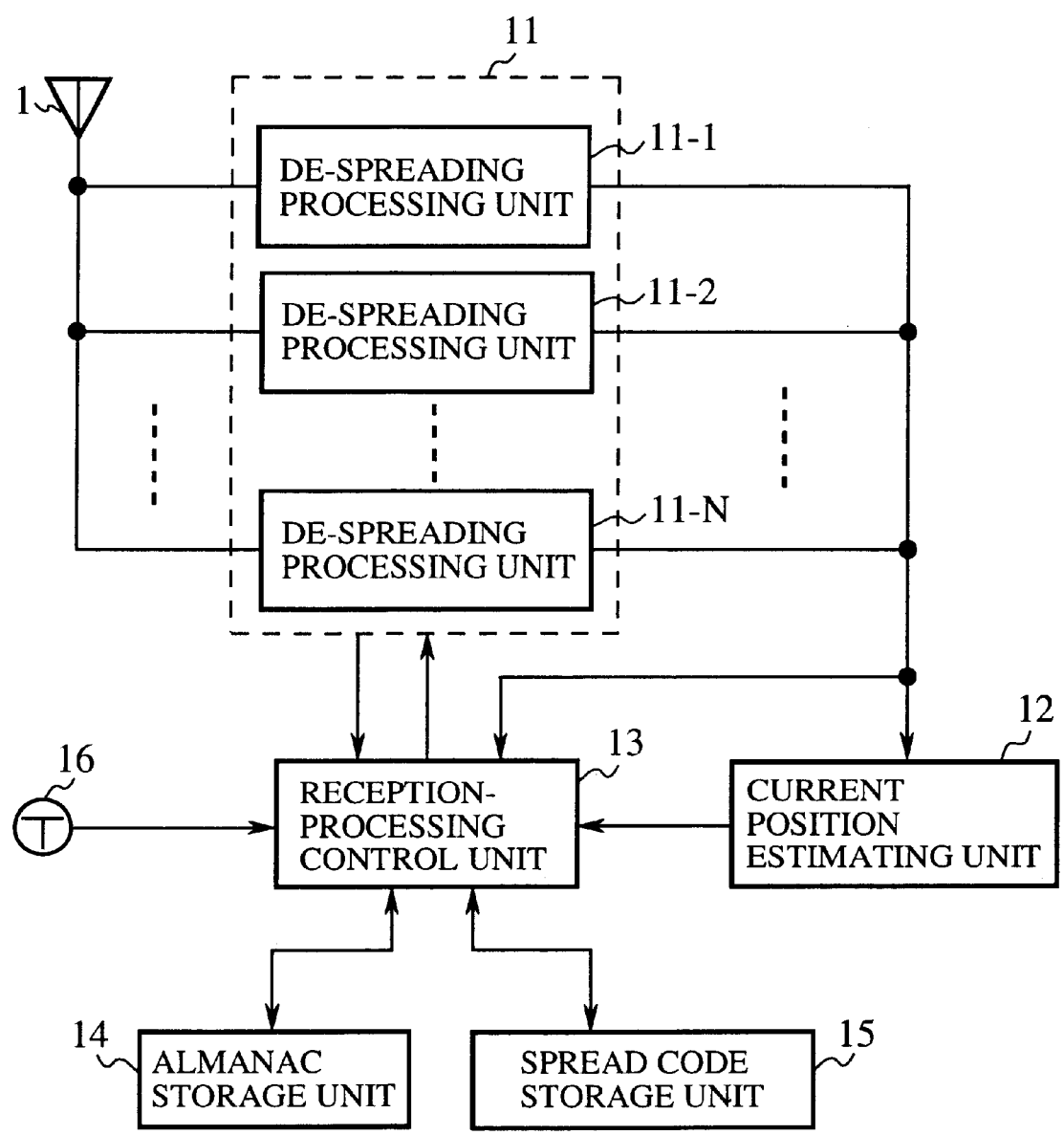
FIG. 2 is a diagram showing the configuration of a GPS receiver implemented by the first embodiment of the present invention.

FIG. 2 is a diagram showing the configuration of the GPS receiver as implemented by the first embodiment of the present invention. In the figure, reference numeral 11 denotes a plurality of de-spreading units (seizing means) each de-spreading a spread spectrum signal received from the GPS satellite by using spread codes received from a reception-processing control unit 13 in order to obtain GPS data by demodulation. The de-spreading units 11-1 to 11-N are provided to correspond to a total of N channels.

Reference numeral 12 denotes a current position estimating unit (positioning means) for estimating the current position and determining the precision of the determination, based on the GPS data generated by the de-spreading units 11-1 to 11-N. Reference numeral 13 denotes a reception-processing control unit (seized object management means) for requesting the de-spreading units 11-1 to 11-N to cancel all-currently seized satellites when the current position estimating unit 12 fails to complete positioning within a predetermined period of time and then to resume attempts to seize GPS satellites by referring to an almanac stored in an almanac storage unit 14. Reference numeral 14 denotes the almanac storage unit (storage means) for storing an almanac extracted from GPS data generated by the reception-processing control unit 13. Reference numeral 15 denotes a spread code storage unit for storing spread codes for the GPS satellites. Reference numeral 16 denotes a timer.

Figure 3:
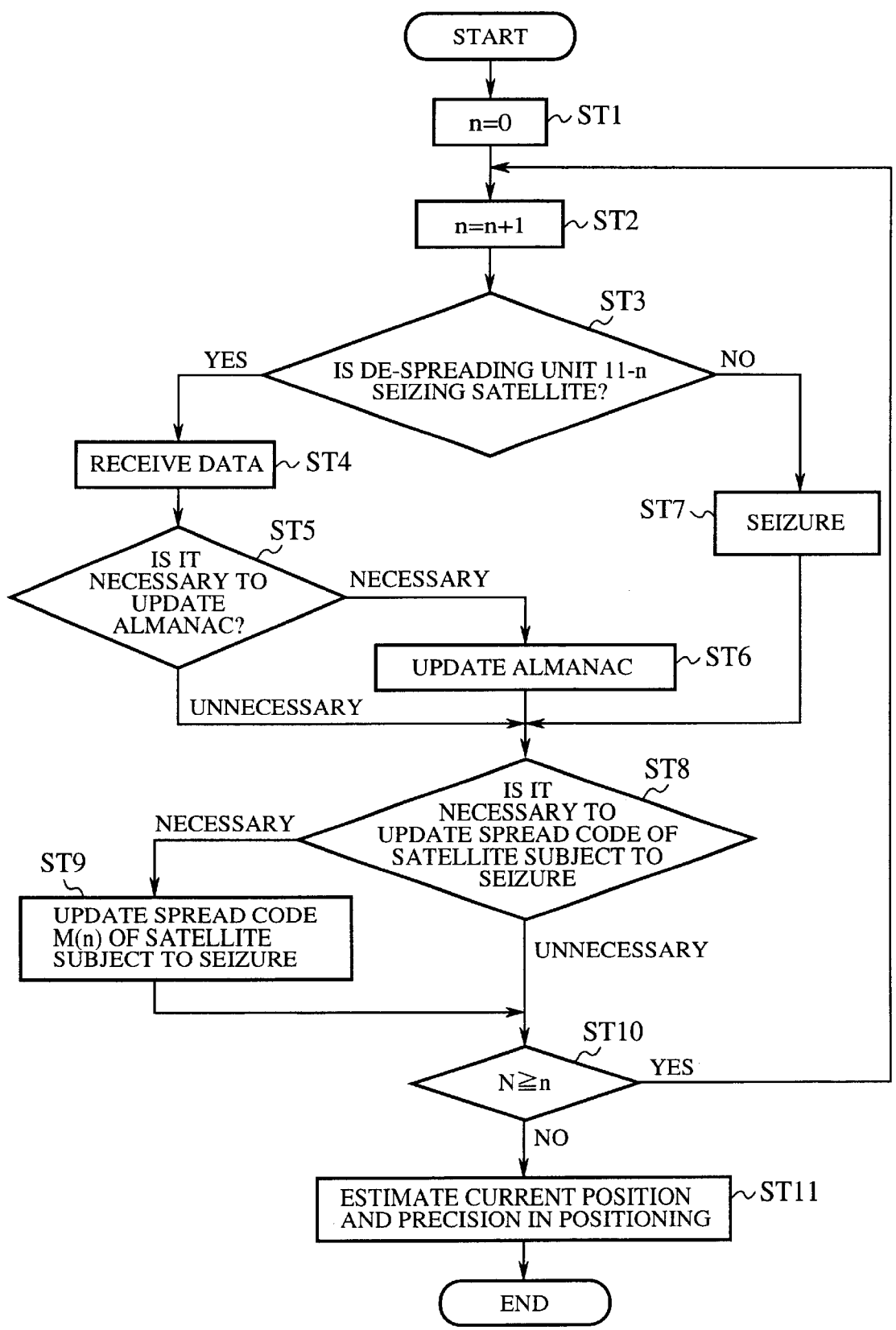
FIG. 3 shows a flowchart representing a positioning method implemented by the first embodiment of the present invention.
Figure 4:
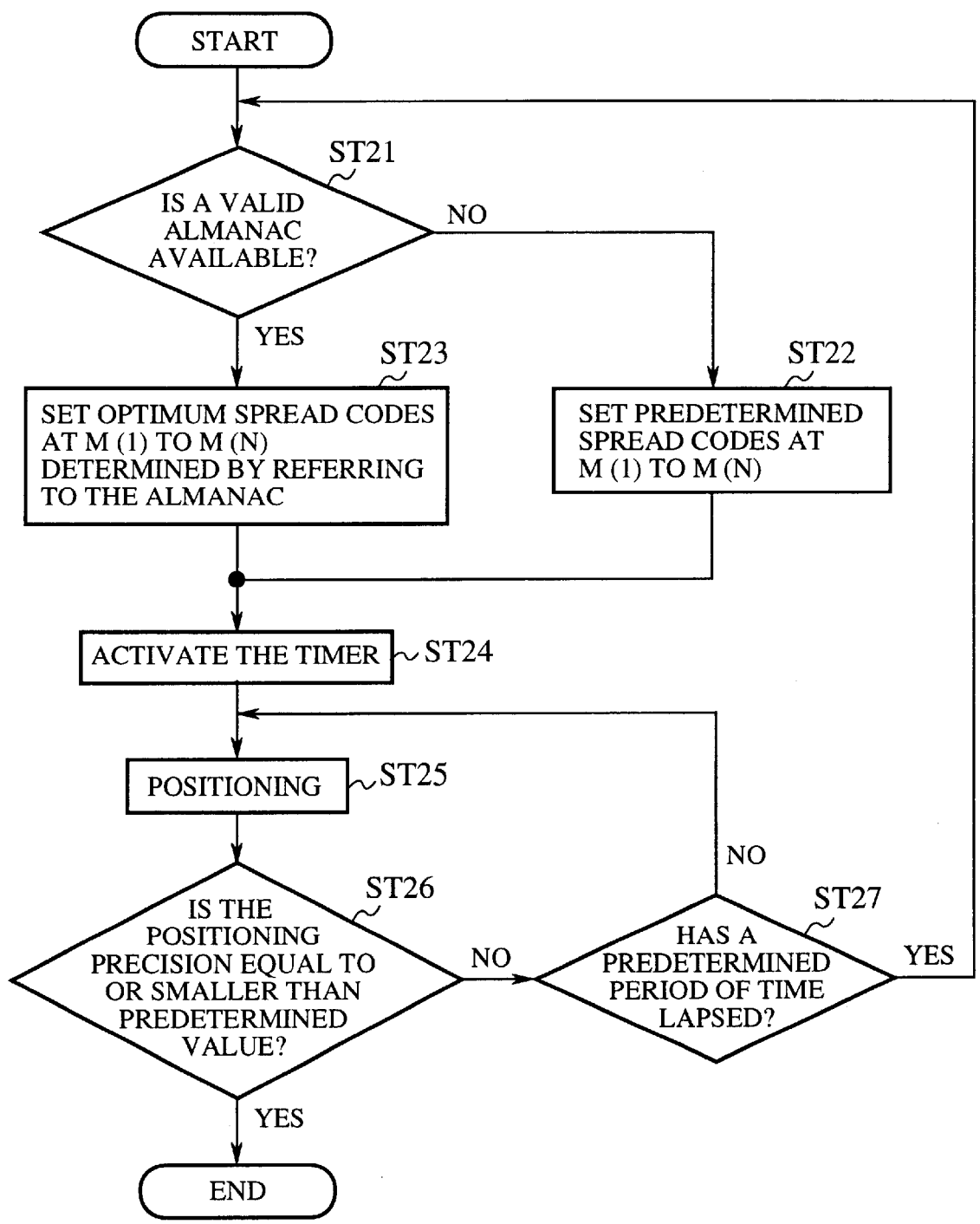
FIG. 4 shows a flowchart representing the operation of a seized object management means.

FIG. 3 shows a flowchart representing a positioning method implemented by the first embodiment of the present invention and FIG. 4. shows a flowchart representing the operation of the reception-processing control unit 13.

The following description explains the operation according to the first embodiment.

When a positioning process is started at a power-on time, the GPS receiver 2 initializes a counter (n=0) (step ST1). Then, the counter value n is incremented (n=n+1) (step ST2).

With the counter value n set as described above, at the next step ST3, the reception-processing control unit 13 in the GPS receiver 2 forms a judgment as to whether or not the de-spreading unit 11-n corresponding to the counter value n has seized a satellite.

If the de-spreading unit 11-n has not seized a satellite, the reception-processing control unit 13 requests the de-spreading unit 11-n to proceed to seize a satellite by, for example, adjustment of synchronization of a spread code with GPS data (step ST7).

If the de-spreading unit 11-n has seized a satellite, the reception-processing control unit 13 acquires GPS data obtained as a result of modulation by the de-spreading unit 11-n (step ST4). The acquired GPS data is compared with stored GPS data, that is, GPS data acquired previously, to form a judgment as to whether or not it is necessary to update an almanac (step ST5).

An almanac is extracted from the GPS data since the almanac is included in the GPS data. If, the extracted almanac is different from an almanac extracted in the past, it is necessary to update the almanac. In this case, the almanac extracted from the most recent GPS data is stored in the almanac storage unit 14 (step ST6).

Then, the reception-processing control unit 13 forms a judgment as to whether or not it is necessary to update the spread code M(n) for the satellite seized by the de-spreading unit 11-n (step ST8). The formation of the judgment is based on the most recent almanac. If it is necessary to update the spread code, the spread code M(n) for the satellite seized by the de-spreading unit 11-n is updated.

Then, the reception-processing control unit 13 forms a judgment as to whether or not the counter value n has exceeded the number of GPS reception channels N (step ST10). If the counter value n has not exceeded the number of GPS reception channels N yet (N≧n) control is returned to step ST2.

If the counter value n has already exceeded the number of GPS reception channels N (N<n), the current position estimating unit 12 provides an estimation of the current position and the precision of positioning, based on the GPS data generated by the de-spreading units 11-1 to 11-N (step ST11).

More specifically, the current position estimating unit 12 acquires a time according to a plurality of GPS satellites by receiving GPS data of the plurality of GPS satellites from the de-spreading units 11-1 to 11-N.

Upon acquiring the time according to the GPS satellites, the current position estimating unit 12 computes a difference between a time according to the GPS receiver 2 and the time according to each GPS satellite to find a distance from the receiver to the satellite in accordance with the following formula:

Distance=Time difference×Speed of light

The current position estimating unit 12 finds the distance from the GPS receiver 2 to each GPS satellite. The current position can then be found from the distances by adopting a generally known technique. As described earlier, if the precision of the computed current position is equal to or smaller than a first threshold value, a 2-dimensional positioning with respect to a latitude and a longitude is assumed to have been completed whereas, if the precision of the computed present position is equal to or smaller than a second threshold value, a 3-dimensional positioning with respect to a latitude, a longitude and a height is assumed to have been completed. It should be noted that the precision of the current position can be found geometrically from the layout of the GPS satellites. The first threshold value is greater than the second threshold value and, the smaller the threshold values, the higher the positional, precision.

The current position estimating unit 12 carries out the processing described above repeatedly until the 2-dimensional positioning or the 3-dimensional positioning is completed in order to determine the current position by determining the distance from the GPS receiver 2 to each GPS satellite. If the measurement is not completed even after a predetermined period of time (for example, 10 minutes) has lapsed, it is inefficient to repeat the positioning process. In such a circumstance, other GPS satellites may be seized to complete the execution of the positioning process in a shorter period of time.

Accordingly, at the power-on time according to the first embodiment, the reception-processing control unit 13 forms a judgment as to whether or not a valid almanac has been stored in the almanac storage unit 14 (step ST21). If no valid almanac is stored in the almanac storage unit 14, predetermined spread codes M(1) to M(N) are supplied to the de-spreading units 11-1 to 11-n, respectively (step ST22). It should be noted that, when the power supply is turned on at an initial time, no valid almanac is stored in the almanac storage unit 14.

If a valid almanac is stored in the almanac storage unit 14, predetermined spread codes M(1) to M(N) are supplied to the de-spreading units 11-1 to 11-n, respectively, by referring to the almanac (step ST23).

After the reception-processing control unit 13 supplies the spread codes M(1) to M(N) to the de-spreading units 11-1 to 11-n, respectively, the timer 16 is activated (step ST24). The positioning process to determine the current position shown in FIG. 3 is then carried out (step ST25).

Then, the reception-processing control unit 13 forms a judgment as to whether or not the positioning precision is equal to or smaller than the predetermined threshold values as described earlier (step ST26). If the positioning precision is equal to or smaller than the predetermined threshold values, the processing is terminated.

If the positioning precision is neither equal to nor smaller than the predetermined threshold values, a judgment is made as to whether a predetermined period of time has lapsed since the activation of the timer 16 (step ST27).

If the predetermined period of time has not lapsed, control is returned to step ST25 to continue the positioning process. If the predetermined period of time has lapsed, control is returned to step ST21, where the almanac stored in the almanac storage unit 14 is referred to so that the spread codes M(1) to M(N) are supplied to the de-spreading units 11-1 to 11-n, respectively (step ST23).

That is, the de-spreading units 11-1 to 11-n are requested to cancel all currently seized satellites and to resume the process to seize satellites by using the spread codes M(1) to M(N) based on the almanac stored in the almanac storage unit 14.

As the 2-dimensional positioning or the 3-dimensional positioning is completed in this way, the current position estimating unit 12 outputs positioning data relating to the current position to the locator 3.

The locator 3, receiving the positioning data from the GPS receiver 2, estimates a current position based on the received positioning data, a car-speed pulse signal indicating a distance traveled by the vehicle and a map database, and outputs positional data. Estimation of the current position is performed using the known art so that the description thereof is omitted.

When the vehicle passes through a tunnel, the locator 3 cannot receive the positioning data form the GPS receiver 2. In such a case, the positional data of the vehicle is generated from the car-speed pulse or the output of a gyro sensor.

The CPU 4 generates picture data representing the current position of the vehicle from the positional data received from the locator 3 and displays the current position on the display unit 5.

As is obvious from the above description, in accordance with the configuration of the first embodiment, when the current position estimating unit 12 fails to complete the positioning process within a predetermined period of time, the de-spreading units 11-1 to 11-n are requested to cancel all currently seized satellites and to resume attempts to seize satellites by referring to the almanac stored in the almanac storage unit 14. The first embodiment thus enables determination of the current position within a short period of time.

Second Embodiment

Figure 5:
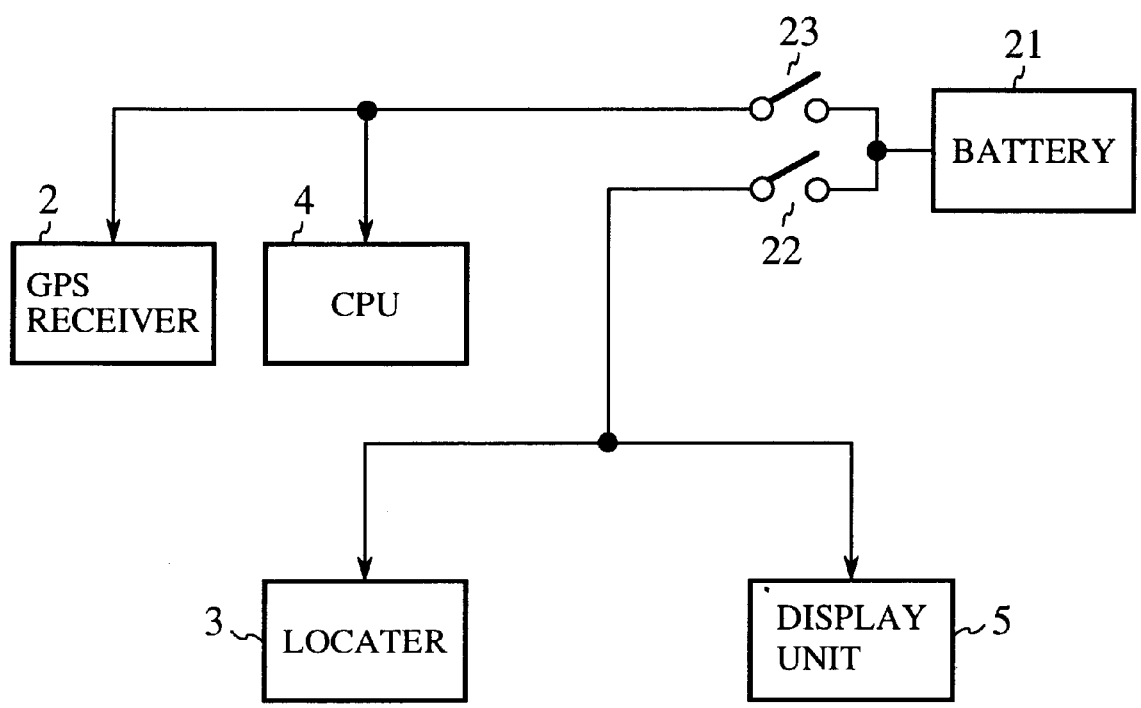
FIG. 5 is a diagram showing a power line for a position-detecting system implemented by a second embodiment of the present invention.

FIG. 5 is a- diagram showing a power line for a position-detecting system implemented by a second embodiment of the present invention. Those components of the second embodiment that are identical with or equivalent to the corresponding components of the first embodiment are designated by the same reference numerals and the description thereof is omitted.

Reference numeral 21 denotes a battery for supplying power to the position-detecting system and reference numeral 22 denotes an accessory switch (ACC) of the vehicle. When the ACC 22 is turned on, power is supplied to the locator 3, the display unit 5, a radio and the like provided in the vehicle. Reference numeral 23 denotes a switch (power supply closing means), which is turned on when a door of the vehicle is released from a locked state by, for example, a remote operation before the ACC 22 is turned on. When the switch 23 is turned on, the battery 21 supplies power to the GPS receiver 2 and the CPU 4.

The following-description explains the operation.

The first embodiment has been explained by assuming that power is supplied to all components composing the position-detecting system. If power is supplied to the GPS receiver 2 and the CPU 4, GPS satellites required for positioning may be seized to identify the current position of the vehicle, even if no power is supplied to the other components including the display unit 5.

According to the second embodiment, the current position and the number of reception satellites appear on the display unit 5 as soon as the user turns on the ACC 22, by ensuring that power is supplied to the GPS receiver 2 and the CPU 4 before the user gets on the vehicle and turns on the ACC 22.

In the case of the position-detecting system shown in FIG. 5, when the door-lock state of the vehicle is released by a remote operation, the switch 23 is turned on, causing the battery 21 to supply power to the GPS receiver 2 and the CPU 4.

In the second embodiment described above, when the door-lock state of the vehicle is released, the switch 23 is turned on. Alternatively, the switch 23 is turned on anytime before the ACC 22 is turned on. The switch 23 may be turned on when the door of the vehicle is opened, for example.

The present invention is not limited to the above-described embodiments, and variations and modifications may be made without departing from the scope of the present-invention.

What is claimed is:

1. A GPS receiver comprising:

storage means for storing an almanac included in GPS data received from a satellite currently being seized;

seizing means for searching said almanac stored in said storage means for other seizable satellites in addition to the satellite currently being seized and proceeding to seize said other satellites;

positioning means for determining a current position based on the GPS data received from a plurality of satellites currently being seized by said seizing means; and seized-object management means for requesting said seizing means to cancel all currently seized satellites and to resume attempts to seize satellites by referring to the almanac stored in said storage means, when said positioning means fails to complete a positioning process of the current position determination within a predetermined period of time.

2. The GPS receiver according to claim 1, wherein said seizing means identifies seizable satellites by referring to the almanac to identify current positions of all satellites.

3. A position-detecting system comprising a receiver and presenting means, wherein said receiver comprises:
storage means for storing an almanac included in GPS data received from a satellite currently being seized;
seizing means for searching said almanac stored in said storage means for other seizable satellites in addition to the satellite currently being seized and proceeding to seize said other satellites;
positioning means for determining a current position based on the GPS data received from a plurality of satellites currently being seized by said seizing means; and
seized-object management means for requesting said seizing means to cancel all currently seized satellites and to resume attempts to seize satellites by referring to the almanac stored in said storage means, when said positioning means fails to complete a positioning process of the current position determination within a predetermined period of time; and wherein
said presenting means presents the current position determined by said GPS receiver.

4. The position-detecting system according to claim 3, further comprising power supply closing means for turning on a power supply of said GPS receiver when a predetermined operation is carried out before a power supply of said presenting means is turned on.

5. The position-detecting system according to claim 4, wherein s aid power supply closing means turns on said power supply of said GPS receiver when a door-lock state of a mobile object is released.

6. The position-detecting system according to claim 4, wherein said power supply closing means turns on said power supply of said GPS receiver when a door of a mobile object is opened.

7. A position-measuring method comprising the steps of:

receiving GPS data from a satellite currently being seized and storing an almanac included in said GPS data;

searching said almanac for other seizable satellites in addition to said satellite currently being seized and proceeding to seize said other satellites;

determining a current position based on the GPS data received from a plurality of satellites currently being seized by said seizing means; and canceling all currently seized satellites and resuming attempts to seize satellites by referring to the almanac stored in said storage means, when the step of determining the current position fails to be completed within a predetermined period of time.

8. The position-measuring method according to claim 7, wherein seizable satellites are identified by referring to the almanac to identify current positions of all satellites.

* * * * *